April 5, 1938.  G. E. JONSSON.  2,113,088
STEPWISE VARIABLE CHANGE SPEED GEAR
Filed July 14, 1936
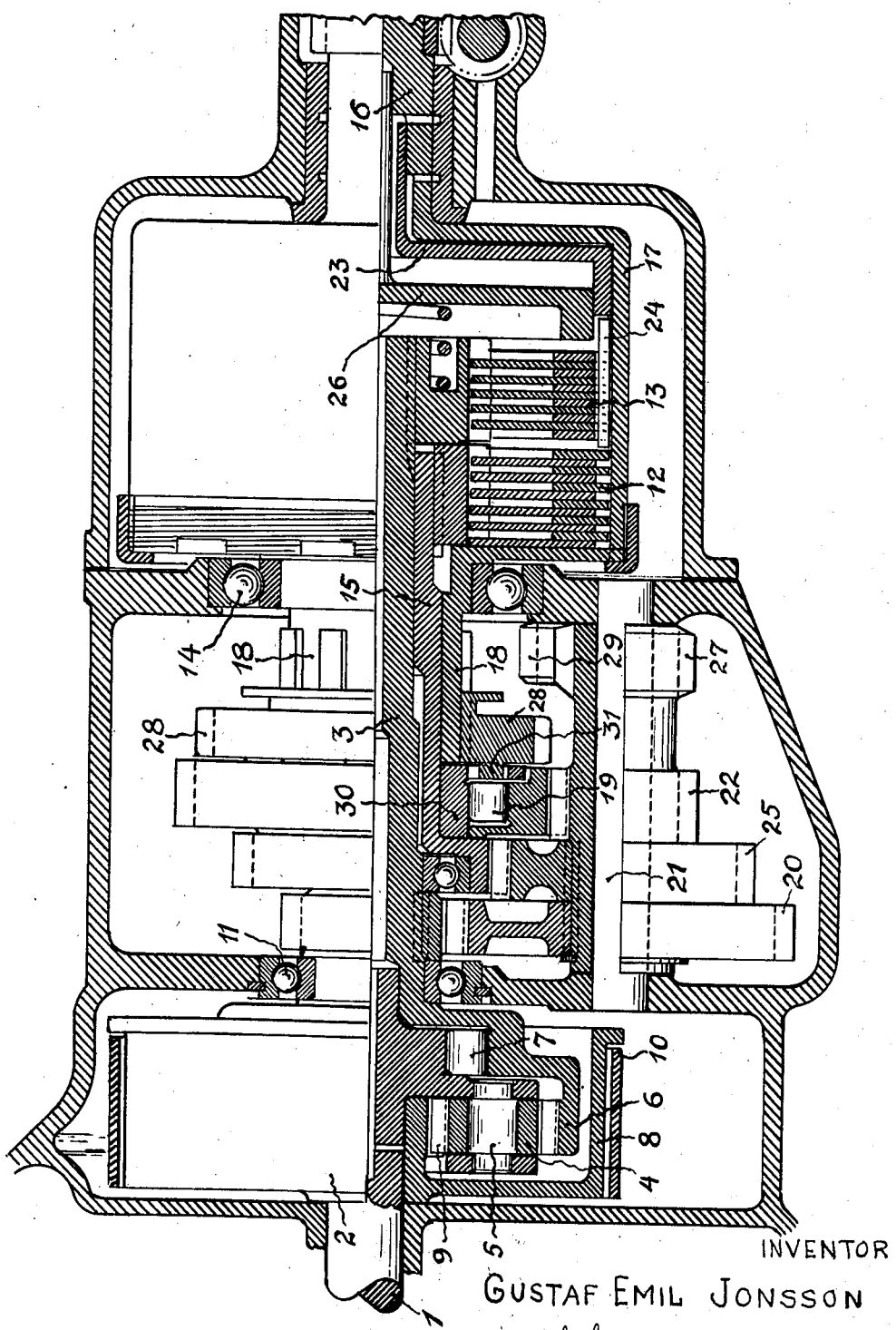
INVENTOR
GUSTAF EMIL JONSSON
By Bonnelycke, Young, Emery & Thompson
ATTORNEYS Patented Apr. 5, 1938

2,113,088

UNITED STATES PATENT OFFICE 2,113,088

STEPWISE VARIABLE CHANGE SPEED GEAR

Gustaf Emil Jonsson, Huddinge, Sweden

Application July 14, 1936, Serial No. 90,605

2 Claims. (Cl. 74—330)

The present invention refers to an improvement in step-wise variable change speed gears mainly intended for use in connection with driving transmissions for motor cars, but naturally employable also for other purposes when it is desired, from a driving shaft, by means of suitable toothed gears to transmit to a driven shaft a torque, or torsional moment, adapted according to the circumstances and the load on the latter.

The invention refers to the known type of variable change speed gears, or gear boxes, which are provided with two or more toothed gears of different gear ratios simultaneously in mesh with each other and adapted selectively to be brought in action for the power transmission, whereby the construction, for such purpose, is provided with a number of uni-directionally acting clutches, generally roller clutches, which permit a lag in the toothed gear, or gears, which at a certain instance are not engaged in the power transmission.

Besides, the invention also refers to such change speed gears, or gear boxes, which are provided with a so-called cruising gear, or over drive, i. e. a gear by means of which the driven shaft may be given a greater rotational speed than the driving one.

In change speed gears of this type known per se, the invention is mainly characterized by a special positioning of the cruising gear and of one or more releasable friction clutches (lamina clutches) for engagement and disengagement of different gears of lower order in relation to the toothed gear wheels of such last mentioned gears, and by a special formation of the driven shaft required by such positioning.

The object of the invention is to provide for a counter-balancing of the gear system required in gear boxes for motor cars, and a reduced distance between the fixed bearings, so as to obtain a vibration-free function of the whole construction when using very much reduced dimensions on the constructional parts included therein.

In gear boxes for motor cars, in which the invention is mainly intended to be applied in practice, the driving and driven shafts are mounted in the extension of each other, and according to the invention the cruising gear is positioned nearest to the end of the gear box, at which the driving shaft enters the same, whereas the friction clutch, or clutches intended for control of the gears of lower order are mounted within the gear box at the opposite end thereof, i. e. the end at which the driven shaft extends, and the wheels of the gears of lower order will be positioned between the friction clutch, or clutches, and the cruising gear.

In order to make it possible to construct the gear box in this manner, the driven shaft is carried out in the shape of a housing around the friction clutch, or clutches, and a sleeve surrounds the driving shaft extension on that side of the said housing, which is opposite to the end of the driven shaft extending from the gear box.

Thereby a good counter-balancing of the constructional parts is obtained and also a vibration-free running, these results making it possible to employ considerably reduced dimensions on all of the mechanical units included in the aggregate. On the other hand, this results also in a reduced weight and a smaller requirement in respect of space for the gear box, which is of the greatest importance as far as modern motor cars are concerned. Naturally the gear box will also be less costly.

When starting from the inventive idea hinted at above, the constructional formation, or shape, of the different parts included in the change speed gear may naturally be varied in a plurality of different manners according as a greater or smaller number of different gear ratios are to be counted with.

As a rule, and apart from the back gear, it is desired to have three different gears for forward drive in common driving, and besides a cruising gear adapted to come in action at greater driving speeds. According to the invention, the gear box is constructed in such a manner that the cruising gear may be brought in action together with any of the gears of lower order, and thereby the number of different gears at hand will be substantially twice as great as otherwise.

The invention is illustrated in the accompanying drawing which shows the gear box in longitudinal section, such gear box including, apart from the back gear, three different gears for common forward drive and a cruising gear.

As all of the constructional parts of the aggregate are both previously known per se and acting in the conventional manner, it seems superfluous to describe the same to those skilled in the art, and since the characteristics of the invention are substantially to be found in the relative positioning of said constructional parts in the aggregate, the invention may simply be disclosed by reference to the manner of action of the gear box as a whole only.

In the drawing, 1 is the driving shaft which by means of the cruising gear 2 is releasably connectible with a shaft extension 3 extending into the gear box and forming a part of the driving shaft when coupled to the latter. The cruising gear is an epicyclic gear having the planet wheels 4 mounted on pins 5 supported by a flange on the driving shaft 1 and engaging at the outer side in a toothed ring 6 on the sleeve-shaped end of the shaft extension 3. A uni-directional roller clutch 7 is provided between the said sleeve-shaped end of the shaft extension and the driving shaft 1, this clutch being active for forward drive only. A brake drum 8 is freely rotatably mounted on the driving shaft and is provided with a gear 9, said gear being in mesh with the inner sides of the planet wheels, and the brake drum is surrounded by a brake strap 10, which by suitable means (not shown) is adapted to be brought in contact with the brake drum for stopping the same.

The cruising gear acts in the following manner:—

When the brake strap 10 is not applied to the drum, the shaft 1 drives the shaft extension 3 by means of the roller clutch 7, the planet wheels 4 and the brake drum taking part in the rotation around the axis of the driving shaft. If the brake strap 10 is applied, so that the brake drum is stopped, the gear 9 will also be stopped. Then the planet wheels 4 roll on the said gear and drive the shaft extension 3 at an increased speed by means of the toothed ring 6, and the requisite lag being possible due to the uni-directional action of the clutch 7. This engagement, or disengagement, of the cruising gear by application of the brake strap may naturally be performed irrespective of the other gears in action within the gear box, and the control may be performed by means of a common brake lever, but hydraulic control means are preferably employed for the purpose.

From the foregoing it will be noted that the cruising gear is positioned at the extreme end of the gear box, at which the driving shaft enters the same, and due to the construction described it will be possible to mount a fixed bearing 11 separating the cruising gear from the other gears within the box, so that the free length of the driving shaft is reduced as far as possible.

A pair of friction clutches (lamina clutches) 12 and 13 are mounted at the opposite end of the gear box, and in the same manner as described above they are separated from the intermediate gear wheels within the box by means of a fixed bearing 14, the free length of shaft being also the smallest possible as far as said friction clutches are concerned, and the friction clutches form a counterbalancing constructional element relatively to the cruising gear, so that a vibration-free running is secured, simultaneously as the short free length of the shafts permits a reduction of the dimensions of all of the constructional parts. The positioning of the clutches in this way requires a special construction of the driven shaft, however, as will be described in the following.

The shaft extension 3 extends entirely through the friction clutches, and by means of a slot and key connection it is connected with the driving laminae of the clutch 13, whereas the driven laminae of said clutch are similarly connected with the driven shaft.

The shaft extension 3 is surrounded by a sleeve-shaft 15 freely rotatably mounted on the former and rigidly connected with the driving laminae of the clutch 12, the driven laminae of the latter being also connected with the driven shaft which for this purpose is constructed as a housing 17 surrounding the clutches, this housing extending into the gear box in the shape of a sleeve 18, which is freely rotatably mounted on the sleeve-shaft 15 and connected with the driven member of a uni-directionally acting roller clutch 19. Hence the sleeve 18 and the housing 17 form parts of the driven shaft 16.

If the cruising gear is at first not taken into consideration the driving shaft 1 drives the shaft extension 3 by means of the roller clutch 7, and by means of the toothed gear 20 the shaft extension 3 drives the secondary shaft 21, which latter drives the sleeve-shaft 15, the housing 17 and the driven shaft 16 by means of the first gear 22 and the roller clutch 19.

If the friction clutch 12 is engaged, for instance by means of a hydraulic piston 23 and slidable keys 24, the housing 17 is locked to the sleeve-shaft 15. Then the drive is performed by the secondary shaft 21 in the manner described above, and from the latter by means of the second gear 25, the sleeve-shaft 15, the friction clutch 12 and the housing 17 to the driven shaft 16, the first gear 22 also in mesh being permitted to lag behind due to the presence of the uni-directional roller clutch 19.

Now, in case the friction clutch 13 is engaged, for instance by means of a hydraulic piston 26, simultaneously as the clutch 12 is disengaged, the shaft extension 3 will be directly coupled to the housing 17 and the driven shaft 16, the direct drive being then in action.

In order to bring in the cruising gear, the brake strap 10 may be applied so that the said gear comes in action in the manner described above, and naturally the cruising gear may be used in the same manner in connection with both the first and second gears, although such action will perhaps scarcely be used in practice.

A back gear should, naturally, also be present in the gear box. This back gear comprises a gear wheel 27 mounted on the secondary shaft 21, another gear 29 driven from the gear 27, and a third gear 28 slidably mounted on the sleeve 18 by means of a slot and key connection. When reverse speed is desired, the gears 28 and 29 are brought into mesh. The side of the gear wheel 28 facing the roller clutch 19 is constructed in the shape of a claw-coupling member adapted for coaction with a correspondingly constructed flange on the driven member 30 of the roller clutch 19, which member is rotatably mounted on the sleeve 15. With forward drive, the driven clutch member 30 is connected to the sleeve 18 by means of the claws on the gear 28, but with backward drive the member 30 is free to rotate on the sleeve 15 relatively to the sleeve 18.

What I claim and desire to secure by Letters Patent is:—

1. In a variable change speed gear, a gear box, axially alined driving and driven shafts, an intermediate shaft adapted to be driven from the driving shaft and carrying a series of gears, two concentric sleeves surrounding the driving shaft, each sleeve carrying a gear adapted continually to mesh with a corresponding gear on the intermediate shaft to form therewith a conventional change speed gear, two friction clutches for selectively connecting the driving shaft and the innermost sleeve, respectively, to the driven shaft, said friction clutches being arranged within the gear box at the end thereof at which the driven shaft enters the box, a solid drum-shaped member for connecting the outermost sleeve to the driven shaft, said member forming a housing for the friction clutches, a uni-directional clutching means in the gear pertaining to the outermost sleeve, a fixed bearing for the shafts and sleeves provided between the friction clutches and the conventional change speed gears, and another fixed bearing for the driving shaft provided ahead of the said gears.

2. In a variable change speed gear according to claim 1, the additional feature that the friction clutches are adapted to be actuated by means of hydraulic pistons mounted within the housing that surrounds the friction clutches.

GUSTAF EMIL JONSSON.